Dec. 30, 1930. O. O. JOHNSON 1,786,849
TRIMMER
Filed June 28, 1929
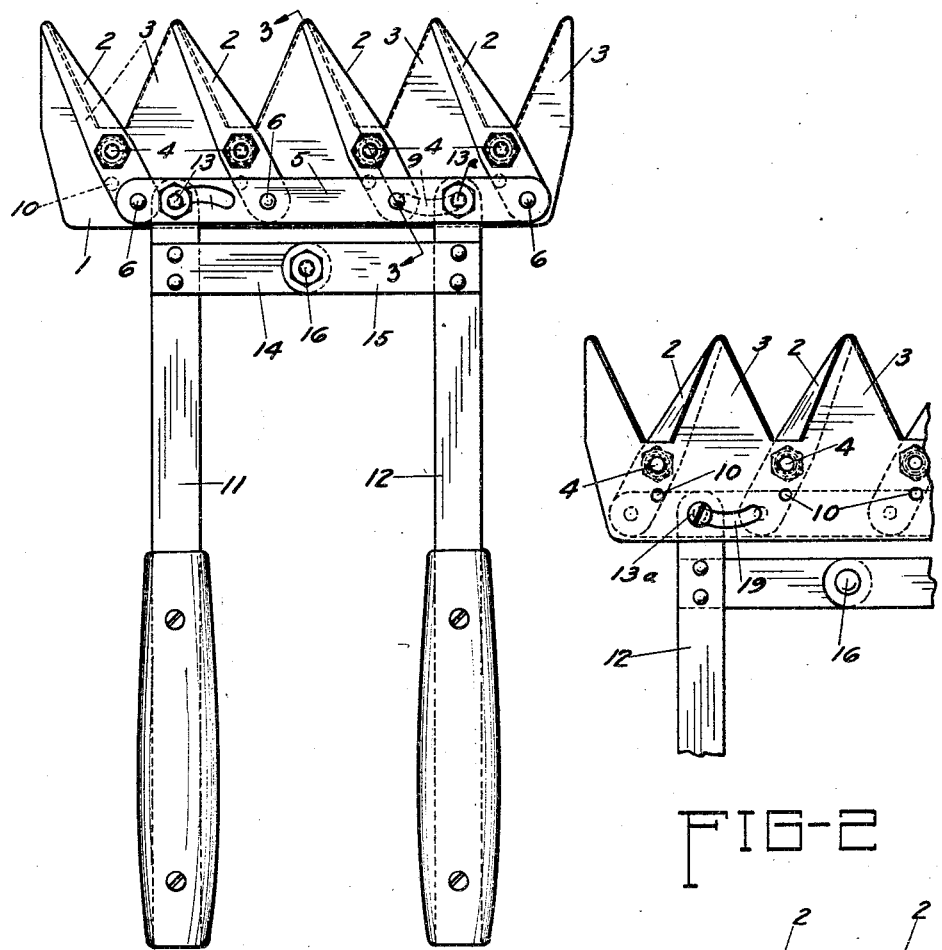
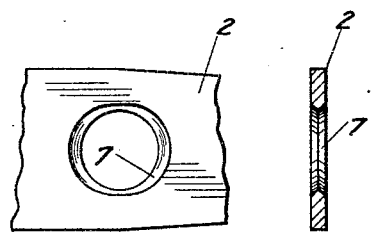
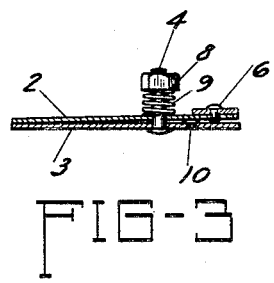
O. O. JOHNSON INVENTOR.
BY Merrill M. Blackburn
ATTORNEY Patented Dec. 30, 1930

1,786,849

UNITED STATES PATENT OFFICE

OTIS O. JOHNSON, OF MOLINE, ILLINOIS

TRIMMER

Application filed June 28, 1929. Serial No. 374,513.

The present invention relates to trimmers and is more particularly concerned with a mechanism for the trimming of grass around lawns, or the trimming of hedges.

Among the objects of this invention are to so construct a trimmer for the purpose indicated that the edges of the cutting members will be always held in contact at the cutting point; to so construct an implement of the character stated that the swinging blades may rock about their pivot points so as to always keep the blades in their most effective cutting position; to so construct an implement of the character stated that both of the operating handles will be pivoted and will move substantially equal distances while the fixed member of the cutter will remain substantially stationary; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of my invention, I desire the same to be understood as illustrative only and not to be construed in a limiting sense.

In the drawing annexed hereto and forming a part hereof, Fig. 1 shows a plan of my improved construction; Fig. 2 is a fragmentary plan of the construction shown in Fig. 1, looking at the same from the opposite side; Fig. 3 is a section substantially along the plane indicated by the line 3—3, Fig. 1; Fig. 4 shows a fragmentary plan, a longitudinal section and a tranverse section through one of the blades, showing the shape of certain openings therein. Referring more in detail to the annexed drawing, the main cutter plate or body element is designated by the numeral 1 and the movable cutter plates or elements by the numeral 2, the body 1 being provided along its forward edge with fixed cutter elements 3 resembling sections of a sickle though the edges thereof are not ground with such acute edge angles as sections are customarily ground with. The movable cutter elements 2 are pivoted at 4 to the body 1 and are connected at their rear ends by a link 5. The link 5 and the elements 2 are pivotally connected by the rivets 6 which permit easy relative turning movement thereof. The openings in the elements 2 for the bolts 4 and rivets 6 are preferably reamed out as shown at 7 in Fig. 4. The purpose of this is to enable the cutter elements 2 to rock both longitudinally and transversely, the same being held, at the same time, against longitudinal sliding motion. Surrounding the bolts 4 and compressed between the cutter elements 2 and the nuts 8 are springs 9 which hold the cutter elements down against the sections 3, thus keeping the same in contact at the cutting point at all times. In order to insure the desired longitudinal and transverse rocking of these elements, round headed rivets 10 are placed directly back of the bolts 4, thus raising the rear portion of the cutter elements away from the plate 1.

A pair of handles 11 and 12 are connected respectively to the plate 1 and the link 5 by bolts 13 and 13a. Arms 14 and 15 are secured to the handles 11 and 12, rigidly, and are pivotally connected to each other by the bolt 16. Therefore, as the handles turn about their pivots 13, the pivot 16 is caused to recede from or approach the link 5, traveling in an arc about the pivot 13 of the handle 11. Inasmuch as the link 5 is pivoted to the cutter elements 2, it does not travel in a straight line but must take a course corresponding to the course of travel of the rivets 6. Since the bolt 13 is secured in the plate 1 and the link 5 moves relatively thereto, it is necessary that a slot be cut in the link to permit this to move with respect to the pivot bolt 13. This slot is designated by the numeral 18. A similar slot 19 is cut in the plate 1 to permit the pivot bolt 13a to move with respect thereto. This bolt is secured in the link 5 and therefore travels in an arcuate path with that link.

We will now assume that this device is to be used in the cutting of grass in locations inaccessible to a lawn mower. The trimmer having been placed in proximity to the grass to be cut, the handles 11 and 12 are alternately moved outwardly and inwardly and the position of the trimmer is shifted from time to time to new locations and into proximity with uncut grass. As the handles move outwardly and inwardly the link 5 slides longitudinally of the body 1 and turns the pivoted cutting elements 2 about their pivots 4. These pivoted cutter elements 2 and the fixed cutter elements 3, being sharpened upon both edges, the grass is engaged between the sharp edges and is severed. As the elements 2 swing about their pivots 4 their outer extremities are permitted to drop downwardly between two adjacent elements 3, always keeping the cutting edges in contact. This is facilitated by the presence of the rivets 10 which support the rear portion of the blades 2 and permit the springs 9 to force the outer extremities of the blades downwardly toward the fixed member 1. Also, the blades 2 are permitted to rock transversely of their longitudinal axes by reason of the cooperation of the bolts 4 and the beveled openings in the blade. This materially assists in getting the blades in the proper cutting position.

Having now disclosed my invention, I claim:

1. In a structure for the purpose indicated, a body having forwardly tapered projections along the front edge thereof, cutting blades pivoted upon the body and adapted to cooperate with said projections, resilient means tending to press the pivoted blades toward the said body and projections, means for moving the blades about their pivots, and means for tilting the blades transversely to keep their edges in point engagement with the projections at all times in their operative engagement therewith.

2. In a structure of the character indicated, a body member having fixed cutting members projecting from one edge thereof, pivoted cutting members mounted upon the body member and adapted to cooperate, first with one of the projections and then with another, as they swing laterally about their pivots, a link connected with said pivoted members rearwardly of their pivotal connection with the body, said link and said body each having an arcuate slot therein for the reception of pivot bolts, one of said bolts being mounted in the link and slidable in the slot in the body member and the other one being mounted in the body member and slidable in the slot in the link, operating handles pivoted on said pivot bolts and adapted to oscillate the link with respect to the body member, and a separate connection between the handle members permitting them to have pivotal motion with relation to each other.

In witness whereof, I hereunto subscribe my name to this specification.

OTIS O. JOHNSON.